July 9, 1935.  F. J. KREUTZER  2,007,683
WALL CONSTRUCTION OF A FEED STORAGE MECHANISM
Filed Oct. 20, 1932  2 Sheets-Sheet 1
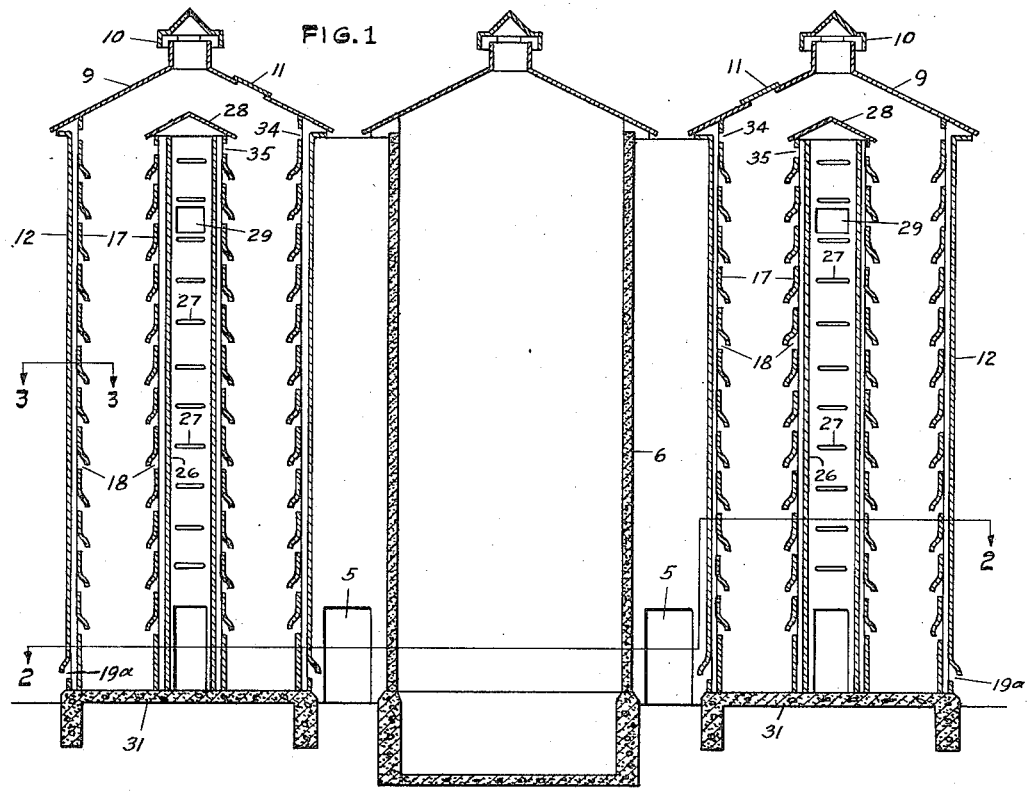
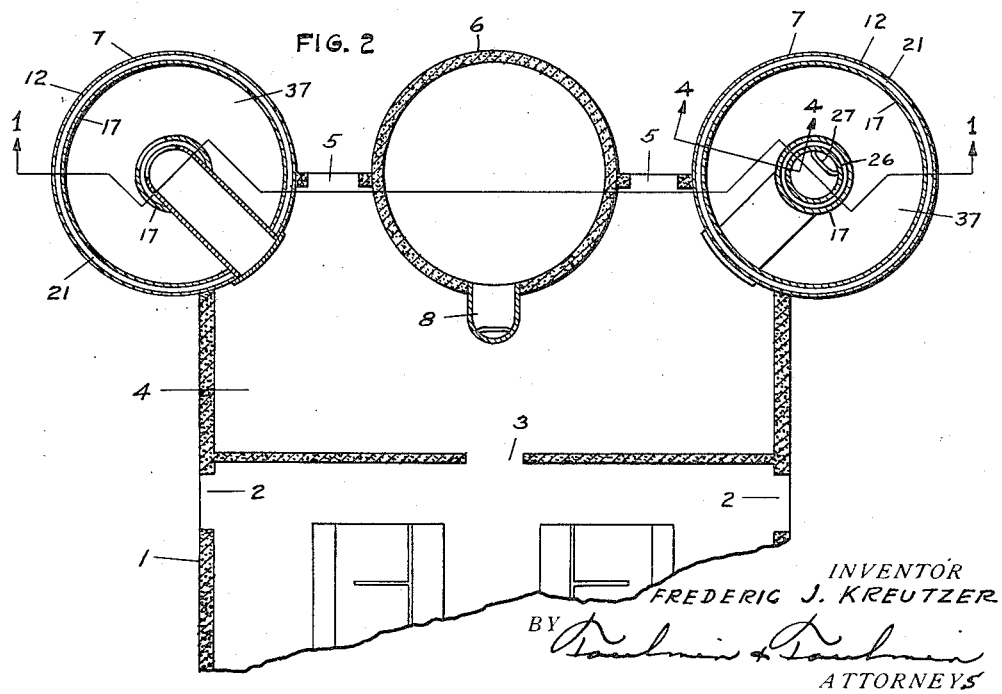
INVENTOR
FREDERIC J. KREUTZER
BY
ATTORNEYS July 9, 1935. F. J. KREUTZER 2,007,683
WALL CONSTRUCTION OF A FEED STORAGE MECHANISM
Filed Oct. 20, 1932 2 Sheets-Sheet 2
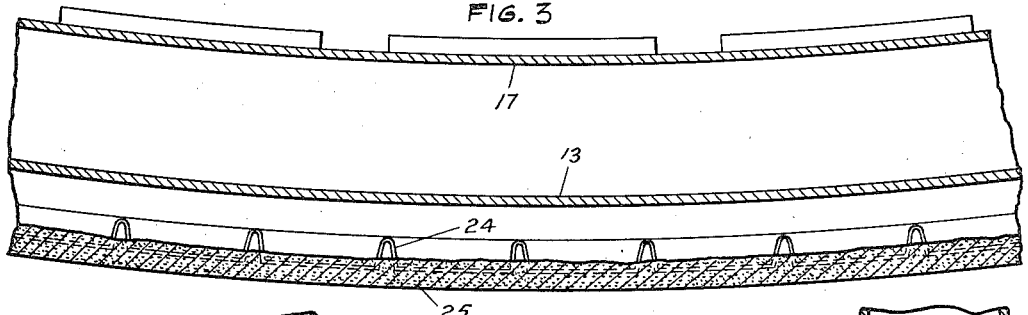
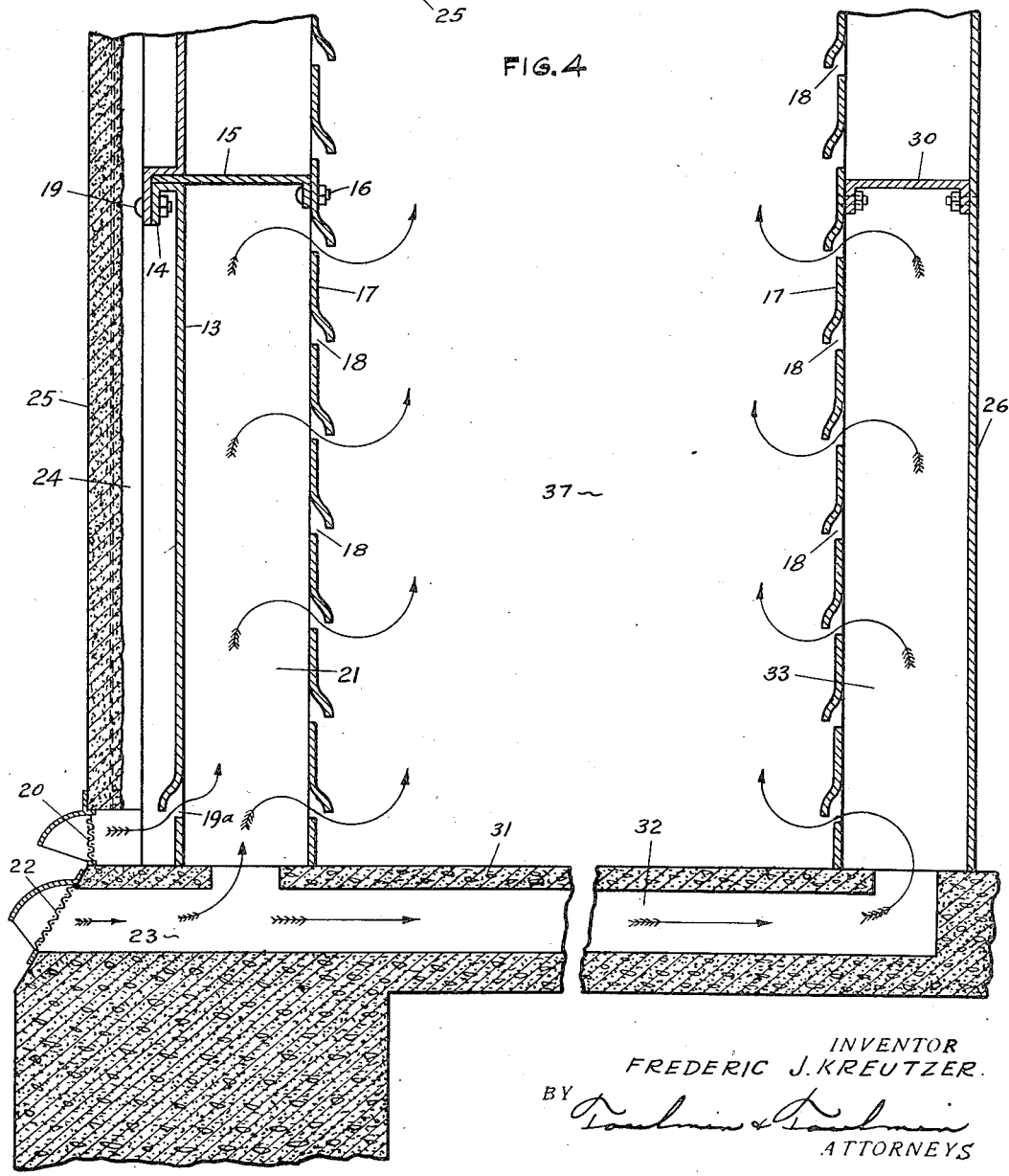
INVENTOR
FREDERIC J. KREUTZER.
BY
ATTORNEYS Patented July 9, 1935

2,007,683

UNITED STATES PATENT OFFICE 2,007,683

WALL CONSTRUCTION OF A FEED STORAGE MECHANISM

Frederic J. Kreutzer, Elmira, N. Y., assignor to James Manufacturing Company, Fort Atkinson, Wis., a corporation of Wisconsin Application October 20, 1932, Serial No. 638,765

4 Claims. (Cl. 98—54)

My invention relates to an apparatus for the storage of food for stock.

It is the object of my invention to provide means of storing hay whereby the hay mass will be completely ventilated, to control its temperature and carry away the generation of gases, and prevent spontaneous combustion.

It is a further object to provide a wall structure for a hay container which permits of the continuous ventilation at different levels of the hay; and in particular provides for a decorative exterior to the container irrespective of its interior condition so that the container is susceptible of the desired architectural embellishments.

It is a further object of my invention to provide a wall construction for a hay container, the inner portion of which provides for free air circulation, the intermediate portion of which provides for the introduction of outside air for such air circulation, for the support of the inside circulatory wall and for the support of an outside decorative wall.

It is a further object of my invention to provide a combination of ensilage and hay containers mutually supporting one another; and arranged for discharge into a common feed assembly room and thence into a feeding stable.

Referring to the drawings, Figure 1 is a vertical section on the line 1—1 of Figure 2.

Figure 2 is a section on the line 2—2 of Figure 1.

Figure 3 is a section on the line 3—3 of Figure 1.

Figure 4 is a section on the line 4—4 of Figure 2.

It will be understood that in Figures 1 and 2 the exterior decorative wall could not be shown in detail by reason of the small size of the figures but that such optional decorative exterior wall is shown in detail in Figures 3 and 4.

Referring to the drawings in detail, 1 indicates a feeding stable having entrance doors 2 and 3. The door 3 communicates with a feed assembling chamber 4 having doors 5. The walls of this chamber 4 interconnect and mutually support a plurality of feed containing chambers, such as the ensilage silo 6 and the hay containers 7. 8 indicates the discharge chute for the ensilage removed and discharged in the usual manner in the room 4.

While the several containers are provided with independent roofs 9 and ventilators 10, it will be understood that a common roof is provided over the room 4 adjoining the containers. Such a roof is of lesser elevation than the independent roofs 9.

Hay containers

The hay containers are designed to receive unchopped or chopped hay, preferably the latter, which hay is delivered into the container through some suitable port such as the sky light window 11.

The container comprises a solid wall 12, preferably of metal formed of a plurality of segmental annular sections 13 having overlapping flanges 14 between which are carried horizontal spacing plates 15, to the ends of which plates are bolted by the bolts 16 the foraminous hay supporting walls 17 having air ports 18 protected by overhanging lips 18a. The bolt 19 clamps the spacer 15 and the overlapping angle portions 14 of the sections 13 together.

The bottom of the wall 13 is provided with an air inlet port 19a which communicates through the grill 20 with the outside air. The air space 21 between the wall 13 and wall 17 is supplied with outside air through the air inlet opening 22 and air passageway 23. The outside of the wall 13 is provided with a plurality of metallic reinforcing members 24 suitably attached to the flanges 14 for supporting stucco or other decorative material 25, or metal lath and stucco, as may be desired.

This permits of a highly decorative finish being imparted to the exterior of the metal wall while at the same time insuring the permanent character of the metal, protecting the metal, protecting the contents of the container from temperature changes, and harmonizing the appearance of the exterior of the container with adjacent buildings. The interior of the container is formed of a continuous chute of metal designated 26 having rungs 27 of the ladder, a cover 28 and spaced doors 29 for the removal of hay therethrough.

This chute 26 is provided with bolted spacer members 30 for spacing a false wall 17 therefrom having the openings 18.

It will be understood that the entire structure is mounted upon a suitable foundation, preferably of concrete, designated 31, which contains the air inlet passageway 23 for the outside air space 21 and the continuation of that passageway 23 as at 32, which provides the air inlet to the passageway 33 between the wall 26 and wall 17. The air from the passageways 21 and 33 which does not pass through the hay through the opening 18 may be discharged either outside or beneath the roof 9 through the ports 34 and 35. However, the primary purpose is to provide for the circulation of air through the entire mass of the hay from side to side at different levels in the hay and thence out the top through the ventilator 10. This is assisted materially by making the distance between the walls 17 no greater than that which will permit of the free circulation of the air to thereby remove gases from the hay and to insure the proper regulation of its temperature and moisture conditions.

It will be further observed that the several containers are mutually supported by an arrangement of the walls of the chamber 4. By so arranging the containers I am enabled to use constructions of lesser strength, of greater height and of greater capacity without the danger from wind storms and other similar disasters.

I desire to comprehend within my invention such modifications as may be embraced within my claims and the scope of my invention.

Having thus fully described my invention, what I claim as new and desire to secure by Letters Patent, is:

1. In a container for food, the combination of a foundation having an air passageway therein, an interior foraminous wall of metal, an intermediate supporting wall of metal spaced therefrom, said space between said walls communicating with said air passageway through said foundation, and an exterior plastic wall supported by said second wall, a port in each of the second and third walls communicating with the space between the first and second walls.

2. In a container for food, the combination of an interior impervious wall, a spaced foraminous wall, a second foraminous wall, a spaced exteriorly disposed continuous wall and a plastic wall supported thereby on the exterior thereof, and a common foundation for all of said walls, said foundation having air passageways for supplying air to the space between said continuous and foraminous walls.

3. In combination in a container, a foundation, an exterior continuous wall having a spaced plastic coating, an interiorly spaced foraminous wall, a central continuous wall chute having doors therein, and a foraminous wall spaced therefrom and disposed on the exterior thereof.

4. In combination in a container, a foundation, an exterior continuous wall having a spaced plastic coating, an interiorly spaced foraminous wall, a central continuous wall chute having doors therein, and a foraminous wall spaced therefrom and disposed on the exterior thereof, said exterior wall having a port for supplying exterior air to the space between the exterior wall and the first mentioned foraminous wall, and said foundation having a passageway from the exterior to the space between the chute and its foraminous wall.

FREDERIC J. KREUTZER.